US012590652B2

(12) United States Patent　　　　(10) Patent No.: US 12,590,652 B2
Ballard et al.　　　　　　　　　　　(45) Date of Patent: *Mar. 31, 2026

(54) THIN-WALLED HEAT SHRINK TUBING

(71) Applicant: ZEUS COMPANY INC., Orangeburg, SC (US)

(72) Inventors: Robert L. Ballard, Lexington, SC (US); Tyler Poole, Orangeburg, SC (US)

(73) Assignee: Zeus Company Inc., Orangeburg, SC (US)

( * ) Notice: Subject to any disclaimer, the term of this patent is extended or adjusted under 35 U.S.C. 154(b) by 359 days.

This patent is subject to a terminal disclaimer.

(21) Appl. No.: 18/142,742

(22) Filed: May 3, 2023

(65) Prior Publication Data

US 2023/0383870 A1　　Nov. 30, 2023

Related U.S. Application Data

(63) Continuation of application No. 17/722,135, filed on Apr. 15, 2022, now Pat. No. 11,680,664.

(51) Int. Cl.
　　*F16L 11/04*　　(2006.01)
　　*B29K 27/18*　　(2006.01)
　　*B32B 1/08*　　(2006.01)
　　*F16L 11/12*　　(2006.01)

(52) U.S. Cl.
　　CPC ................ *F16L 11/04* (2013.01); *B32B 1/08* (2013.01); *F16L 11/12* (2013.01); *B29K 2027/18* (2013.01); *B29K 2995/0049* (2013.01)

(58) Field of Classification Search
　　CPC . F16L 11/04; F16L 11/12; F16L 47/22; B32B 1/08; B29K 2027/18; B29K 2995/0049
　　See application file for complete search history.

(56) References Cited

U.S. PATENT DOCUMENTS

2008/0317991 A1 * 12/2008 Pieslak ................... B29C 41/32
　　　　　　　　　　　　　　　　　　428/36.91

* cited by examiner

*Primary Examiner* — Michael C Miggins
(74) *Attorney, Agent, or Firm* — Womble Bond Dickinson (US) LLP; Jessica L. Gorczynski

(57) ABSTRACT

A heat shrink tubing is provided exhibiting various desirable properties, which generally comprises at least one fluorinated polymeric resin. The tubing can exhibit desirable physical properties such as heat shrink capability, high expansion/recovery ratio, low longitudinal shrinkage, low temperature recovery, and an average wall thickness of less than about 0.003 inches.

20 Claims, 3 Drawing Sheets

THIN-WALLED HEAT SHRINK TUBING

CROSS-REFERENCE TO RELATED APPLICATION

The present application is a continuation of U.S. patent application Ser. No. 17/722,135, filed Apr. 15, 2022, which application is incorporated by reference in its entirety herein and for all purposes.

FIELD OF THE INVENTION

The present application is directed to heat shrink polymeric tubing and methods for making such heat shrink polymeric tubing, which finds application in a variety of fields.

BACKGROUND OF THE INVENTION

Heat shrink tubing generally comprises a plastic material that is extruded into a tubular form and expanded. The extruded and expanded tube is designed to shrink (i.e., decrease in diameter) when heated to a given temperature. As such, heat shrink tubing can serve various functions. It can provide a tight, protective jacketing to closely cover and insulate various elements (e.g., to protect them from abrasion and to provide thermal, chemical, moisture, and/or electrical insulation); it can serve to bundle certain elements together (i.e., within the same heat shrink tube); it can serve to seal/isolate certain elements from others; it can be used to join/fuse two elements, e.g., two tubes together; and it can serve to modify the properties of an underlying material (e.g., by closing around another material and shrinking that material as well). These capabilities render the tubing useful for various purposes and heat shrink tubing finds use across various fields, e.g., medical, chemical, electrical, optical, electronic, aerospace, automotive, and telecommunications fields.

In the medical context, heat shrink tubing is particularly beneficial in designing increasingly small and more complex devices to be inserted into the body (e.g., catheters, endoscopes, etc.). One representative medical use of heat shrink tubing is in the context of manufacturing a guide catheter, comprising a tubular structure having an inner layer of a polymer, a middle layer of a wire braid and an outer layer of another polymer. To assemble such catheters, an expanded heat shrink tube is typically applied to an assembled shaft around a mandrel and the assembly is exposed to high temperature sufficient to shrink the heat shrink tube. Under these conditions, the outer polymeric layers within the catheter shaft melt and flow, and the heat shrink tube contracts, providing compressive forces such that the inner and outer polymeric layers of the catheter shaft can bond together, encapsulating the wire braid within. The heat shrink tubing is then removed and discarded and the catheter assembly is removed from the mandrel. See, e.g., the disclosures of U.S. Pat. No. 7,306,585 to Ross and U.S. Pat. No. 5,755,704 to Lunn, which are incorporated herein by reference.

It should be noted that heat shrink tubing has been produced commercially for several decades using various processes, for example, vacuum expansion, gas pressure forming, sequential heating/stretching and the like. Known methods for expanding heat shrink tubings are provided, for example, in the disclosures of U.S. Pat. No. 2,987,767 to Edward et al.; U.S. Pat. No. 3,412,189 to Sullivan; U.S. Pat. No. 7,625,194 to Yoshida et al.; U.S. Pat. No. 9,296,165 to Henson; U.S. Pat. No. 9,327,444 to Henson; and U.S. Pat. No. 9,440,044 to Roof et al.; each of which is incorporated herein by reference. However, heat shrink tubing is typically only commercially available in grades having recovery ratios of up to 4:1. For example, typical polytetrafluoroethylene ("PTFE") heat shrink tubing is currently commercially available in recovery ratios up to 4:1 and typical fluorinated ethylene propylene ("FEP") heat shrink tubing is currently commercially available in recovery ratios up to 2:1. Further, these products typically have longitudinal changes in length of up to 15% upon recovery.

Accordingly, there is a need for a tubing that can be applied to device components to encapsulate and compress them as needed, wherein the tubing can provide for high recovery ratios without a corresponding increase in longitudinal change. Further, there is also a need for tubing that has thin walls, capable of enhancing heat transfer during lamination and increasing overall efficiency.

SUMMARY OF THE INVENTION

The present disclosure relates to fluoropolymer heat shrink tubings in expanded form that exhibit higher recovery ratios than conventional heat shrink tubings without a significant corresponding increase in longitude (as is typically seen in conventional heat shrink tubings). Further, certain heat shrink tubings of the present disclosure have thin walls not previously achievable with commercially available fluoropolymer heat shrink tubings and/or are recoverable at lower temperatures than used in conventional heat shrink processes.

One aspect of the present disclosure provides a PTFE heat shrink tubing having a recovery ratio (RR) greater than about 5:1. In some embodiments, PTFE heat shrink tubings of the present disclosure can have recovery ratios greater than about 5.5:1, greater than about 6:1, greater than about 7:1, greater than about 8:1, or greater than about 9:1. In some embodiments, PTFE heat shrink tubings of the present disclosure can have an average wall thickness of 0.003 inches or less after expansion. In certain embodiments, the PTFE heat shrink tubing can have an average wall thickness of about 0.0005 inches or less after expansion.

Another aspect of the present disclosure provides a PTFE heat shrink tubing, wherein a linear regression performed between 310° C. to 330° C. on a diameter change vs. recovery temperature plot yields a slope value of greater than about 1.3%/° C. In some embodiments, the PTFE heat shrink tubing has a RR greater than about 5:1. In certain embodiments, the PTFE heat shrink tubing can have a RR greater than about 5.5:1, greater than about 6:1, greater than about 7:1, greater than about 8:1, or greater than about 9:1. In some embodiments, the PTFE heat shrink tubing according to the disclosure can have an average wall thickness of 0.003 inches or less after expansion. In certain embodiments, the PTFE heat shrink tubing can have an average wall thickness of about 0.0005 inches or less after expansion.

Another aspect of the present disclosure provides a PTFE heat shrink tubing, wherein the difference between a temperature corresponding to a peak temperature of a melting endotherm obtained from a DSC temperature ramp using a 10° C. per minute heating rate and a temperature corresponding to a relative minimum in an E'-T curve obtained in a DMA temperature ramp of a heat shrink tubing specimen oriented circumferentially in the tensile grips is greater than about 7.5° C. In some embodiments, the PTFE heat shrink tubing can have a RR greater than about 5:1. In certain embodiments, the PTFE heat shrink tubing can have a RR greater than about 5.5:1, greater than about 6:1, greater than about 7:1, greater than about 8:1, or greater than about 9:1. In some embodiments, the PTFE heat shrink tubing according to the disclosure can have an average wall thickness of 0.003 inches or less after expansion. In certain embodiments, the PTFE heat shrink tubing can have an average wall thickness of about 0.0005 inches or less after expansion. In some embodiments, a linear regression performed between 310° C. to 330° C. on a diameter change vs. recovery temperature plot yields a slope value of greater than about 1.3%/° C. for a heat shrink tubing of the present disclosure.

A further aspect of the present disclosure provides a heat shrink tubing comprising a tubing with walls comprising PTFE and having an inner diameter (ID), wherein the ID is about 0.3 inches or less after expansion and, upon heating to 350° C. for 10 minutes, the ID is reducible by at least about 78%. In some embodiments, upon heating to 350° C. for 10 minutes, the ID of the heat shrink tubing is reducible by at least about 80%. In some embodiments, the walls of the heat shrink tubing have an average wall thickness of about 0.003 inches or less after expansion. In certain embodiments, the walls of the heat shrink tubing have an average wall thickness of about 0.0005 inches or less after expansion. In certain embodiments, the difference between a temperature corresponding to a peak temperature of a melting endotherm obtained from a DSC temperature ramp using a 10° C. per minute heating rate and a temperature corresponding to a relative minimum in an E'-T curve obtained in a DMA temperature ramp of a heat shrink tubing specimen oriented circumferentially in the tensile grips is greater than about 7.5° C. In some embodiments, a linear regression performed between 310° C. to 330° C. on a diameter change vs. recovery temperature plot yields a slope value of greater than about 1.3%/° C. for a heat shrink tubing of the present disclosure.

These and other features, aspects, and advantages of the present disclosure will be apparent from a reading of the following detailed description together with the accompanying drawings, which are briefly described below. The present disclosure includes any combination of two, three, four, or more features or elements set forth in this disclosure or recited in any one or more of the claims, regardless of whether such features or elements are expressly combined or otherwise recited in a specific embodiment description or claim herein. This disclosure is intended to be read holistically such that any separable features or elements of the disclosure, in any of its aspects and embodiments, should be viewed as intended to be combinable, unless the context of the disclosure clearly dictates otherwise.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

DETAILED DESCRIPTION

Figure 1:
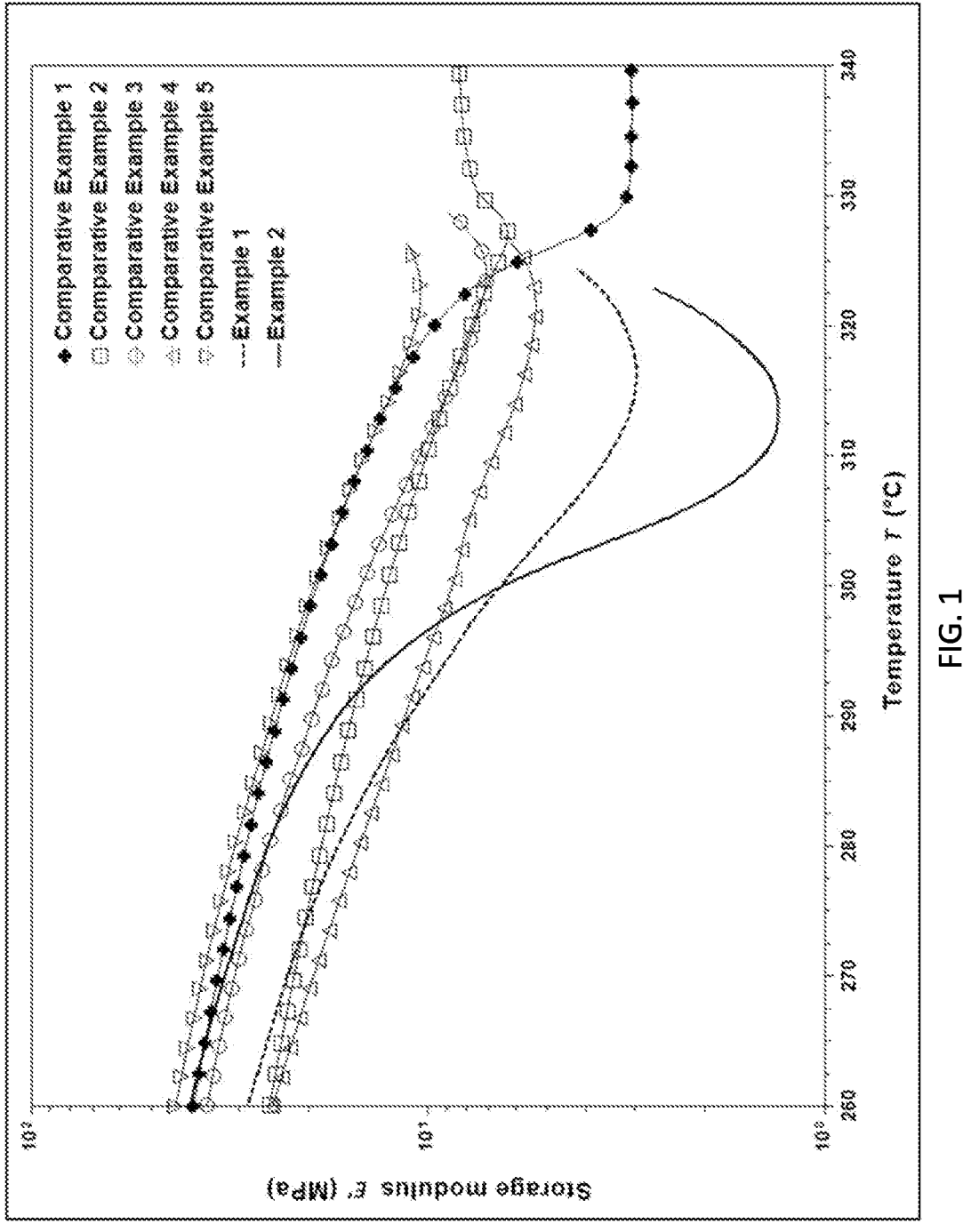
FIG. 1 is a graph showing storage modulus as a function of temperature for PTFE heat shrink tubes prepared according to an example embodiment of the present disclosure compared to several commercially available PTFE heat shrink tubes.

The present invention will now be described more fully hereinafter with reference to the accompanying figures, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The present disclosure provides heat shrink tubings with unique properties and unique combinations of properties, as will be outlined further herein. Generally, a "heat shrink tubing" is a shrinkable tubing prepared via expansion of a polymeric ("input") tubing (e.g., an extruded tubing) to give the heat shrink tubing (also referred to herein as an "expanded" form). Upon heating and/or sintering, the heat shrink tubing "shrinks" to a size equivalent to (or close to) its original/input size, commonly referred to as its "recovered" size. The composition and overall size of a heat shrink tubing according to the present disclosure can vary widely and is not particularly limited. A heat shrink tubing can be defined, e.g., by its inner diameter ("ID") either after expansion (also referred to herein as "expanded inner diameter" (ID e)) or after recovery (also referred to herein as "recovered inner diameter" (ID,)), its length, its average wall thickness, its expansion ratio (ER), and its recovery ratio (RR).

In some embodiments, the disclosed heat shrink tubings comprise, consist essentially of, or consist of one or more fluorinated polymers. Exemplary fluorinated polymers according to the present disclosure include, but are not limited to, fluorinated ethylene propylene (FEP), polyvinylidene fluoride (PVDF), perfluoroalkoxy alkanes (PFA), perfluoro (alkyl vinyl ethers) (PAVE) (e.g., perfluoro (methyl vinyl) ether, PMVE or perfluoro (propyl vinyl) ether (PPVE)), polytetrafluoroethylene (PTFE), a terpolymer of tetrafluoroethylene, hexafluoropropylene and vinylidene fluoride (THV), poly(ethylene-co-tetrafluoroethylene) (ETFE), ethylene chlorotrifluoroethylene (ECTFE), polychlorotrifluoroethylene (PCTFE), a copolymer of tetrafluoroethylene and perfluoromethylvinyl ether (MFA); or a copolymer, blend, or derivative of any two or more of the foregoing. In particular embodiments, the disclosed heat shrink tubings comprise, consist essentially of, or consist of PTFE; such heat shrink tubings may be referred to herein as "PTFE heat shrink tubings." In some other embodiments the disclosed heat shrink tubes can comprise, consist essentially of, or consist of one or more non-fluorinated polymers such as polyaryletherketones. Exemplary polyaryletherketones according to the present disclosure include, but are not limited to, polyetherketone (PEK), polyetheretherketone (PEEK), polyetherketoneketone (PEKK), polyetheretherke-toneketone (PEEKK) and polyetherketoneetherketoneke-tone (PEKEKK).

In some embodiments, one or more additives can be incorporated within the tubing walls. In some such embodi-ments, the one or more additives can be distributed (e.g., substantially uniformly) throughout the wall thickness and length of the tubing. In some embodiments, the one or more additives may include a lubricant, e.g., such as an aliphatic hydrocarbon-based lubricant. In certain embodiments, the lubricant may be naphthalene, for example. It should be noted that the one or more additives referenced herein may, or may not, be present in the final product (i.e., the final heat shrink tubing) according to various embodiments of the disclosure. For example, in certain embodiments, a lubricant may be applied to the polymeric resin (e.g., such as PTFE resin) before extruding the input tubing and the lubricant is subsequently vaporized after the input tubing exits the extrusion die and prior to sintering of the input tubing. The amount of lubricant or other additive that can be contained is not particularly limited. In some embodiments, for example, the additive (e.g., lubricant) may be included in an amount in the range of about 1% to about 30%, about 16% to about 25%, or about 10% to about 20% by weight based on the total weight of the tubing. In other embodiments, the tubing may not include any additives therein.

The size of heat shrink tubings within the scope of the disclosure (e.g., length, diameter (i.e., expanded inner diam-eter, ID), and average wall thickness) is not particularly limited. For example, the length of tubings described herein can vary from individually-sized units (e.g., in some embodiments, on the order of 0.25 inches to 120 inches for catheter manufacturing) to lengths that can readily be trans-ported and further cut into individually-sized units to large-scale production lengths (e.g., on the order of hundreds of feet and the like). The diameters of tubings described herein can vary, in particular, depending upon the application for which the tubing is intended. Certain expanded IDs of the tubings described herein, particularly for medical uses, can range from about 0.01 inches to about 1.5 inches (e.g., about 0.025 inches to about 0.75 inches or about 0.05 inches to about 0.5 inches), although tubings having expanded IDs outside this range are also encompassed by the present disclosure, particularly in the context of applications in different fields. In some embodiments, for example, the expanded ID of the tubing can be in the range from about 0.034 inches to about 4 inches.

With regard to tubing wall thicknesses, it should be noted that the higher expansion/recovery ratios exhibited by the PTFE heat shrink tubings of the present disclosure can, in some embodiments, result in thinner expanded and recov-ered walls than those of commercially available PTFE heat shrink tubings and/or FEP heat shrink tubings, for example, as shown in the examples provided herein below. In certain exemplary embodiments, the heat shrink tubing of the present disclosure may have an average wall thickness in the range of about 0.0001 to about 0.005 inches, about 0.0001 to about 0.0025 inches, or about 0.0001 to about 0.0005 inches. In some embodiments, the heat shrink tubing of the present disclosure may have an average wall thickness of about 0.005 inches or less, about 0.003 inches or less, about 0.001 inches or less, about 0.00075 inches or less, or about 0.0005 inches or less. Such values are after expansion, and before recovery.

These rather thin wall thicknesses can provide for sig-nificant advantages over commercially available PTFE and FEP heat shrink tubings currently used in the market. For example, thin-walled PTFE heat shrink products according to the disclosure can enhance heat transfer during reflow and increase overall efficiency of the reflow process. With respect to FEP heat shrink tubings, it is noted that the thermal conductivity of FEP (0.180 W/mK at reflow tem-peratures of 200° C. or above) is much lower than that of PTFE (0.280 W/mK at reflow temperatures of 200° C. or above), thus evidencing the improved heat transfer of PTFE heat shrink tubing compared to FEP heat shrink tubing. See, e.g., D. M. Price, M. Jarratt, *Thermochimica Acta*, 392, 231, 2002 and L. K. Olifirov, A. A. Stepashkin, G. Sherif, V. V. Tcherdyntsev, *Polymers*, 13, 781, 2021, which are incorpo-rated herein by reference.

The heat shrink tubings described herein can exhibit advantageous properties and combinations of properties, such as two or more of the following: high expansion ratio, high recovery ratio, lower temperature recovery, low change in length upon recovery, and/or thin walls after expansion and/or recovery. In some embodiments, heat shrink tubings are provided which exhibit two of these properties (e.g., high expansion ratio and high recovery ratio, high expansion ratio and lower temperature recovery, high recovery ratio and lower temperature recovery, high expansion ratio and low change in length upon recovery, high recovery ratio and low change in length upon recovery, low temperature recovery and low change in length upon recovery, high recovery ratio and thin walls, high expansion ratio and thin walls, low temperature recovery and thin walls, low change in length and thin walls), three or more of these properties (e.g., high recovery ratio, high expansion ratio, and thin walls; high recovery ratio, high expansion ratio, and lower temperature recovery; high recovery ratio, high expansion ratio, and low change in length upon recovery; etc.), four or more of these properties (e.g., high recovery ratio, high expansion ratio, thin walls, and lower temperature recovery; high recovery ratio, high expansion ratio, thin walls, and low change in length after recovery; etc.), or all five of these properties.

Such properties can be defined using the following equa-tions:

$$\text{Expansion ratio} = ER = \frac{ID_e}{ID_o}$$

$$\text{Recovery ratio} = RR = \frac{ID_e}{ID_r}$$

$$\text{Change in Length} = \Delta L = \frac{L_r - L_e}{L_e}(100)$$

$$\text{Diameter Change} = \Delta D = \frac{ID_e - ID_r}{ID_e}(100)$$

In these equations, $L_e$ and $L_r$ are the length of the heat shrink tubing (in expanded form) and the length of the "recovered" (i.e., heat-shrunk) tubing, respectively. $ID_o$ refers to the original internal diameter (ID) of the input tube (i.e., the tube before it is expanded and then subsequently "shrunk"); ID e refers to the internal diameter (ID) of the expanded heat shrink tubing; and $ID_r$ refers to the internal diameter (ID) of the recovered (heat shrunk) tube. ER, RR, ΔL, and ΔD can be evaluated at any recovery temperature. As used herein, the above parameters were calculated as follows.

The change in length (ΔL) is determined in the following manner. Prior to placing the heat shrink tubing into the oven for unrestricted recovery, the expanded tubing is cut to a length of 4 inches. The 4-inch specimen length is carefully cut from the heat shrink tubing so as to ensure they are no burs or other deformities present, and that they are perpendicular to the longitudinal axis of the tubing. After the unrestricted recovery process at a specified temperature, the tubing length is re-measured using a verified ruler to the nearest $\frac{1}{64}^{th}$ of an inch to determine the amount of shrinkage or growth that has occurred during the process. For example, the expanded length is subtracted from the recovered length and divided by the expanded length, then this quantity is multiplied by 100 to give the overall percentage change in length (ΔL). Typically, the longitudinal change is measured to be in the range of about +/−20% (i.e., the change in length is allowed to grow or shrink by about 20% or less upon recovery). In some embodiments, the longitudinal change is measured to be in the range of about +/−15%, about +/−10%, or about +/−5%. In certain embodiments, longitudinal change has been averaged at 5% or less. Standard time and recovery temperatures for PTFE heat shrink are 350° C. for 10-minutes. FEP standard time and recovery temperatures are 210° C. to 221° C. for 10-minutes. For catheter builds we recover PTFE heat shrink at 260° C. for reflowing the outer jacket.

The expansion ratio (ER) is calculated by dividing the measured expanded ID by the measured input ID. The recovery ratio (RR) is determined in the following manner. Five 4-inch long specimens are cut from the expanded tubing and each respective expanded ID is measured. The specimens are then separately placed into an oven set at a specified temperature for approximately 10 minutes (e.g., the first specimen was heated at 310° C., the second specimen was heated at 320° C., the third specimen was heated at 330° C., the fourth specimen was heated at 340° C., and the fifth specimen was heated at 350° C., respectively). After exposing each heat shrink tubing specimen to a specified recovery temperature for 10 minutes, it is removed from the oven and allowed to cool to ambient temperature. This subjects the expanded heat shrink tubing to an unrestricted recovery process. After cooling to ambient temperature, the recovered tubing is cut into four sections of equal length with a sharp razor blade. This provides five distinct measurement locations along the length of the recovered heat shrink tubing. The ID is then measured at each distinct location using verified measurement tools, the average of which is taken as the recovered ID. The expanded tubing ID is divided by the recovered tubing ID that is measured after the unrestricted recovery process resulting in the recovery ratio (RR) of the heat shrink product at the specified temperature. Subsequently, the diameter change of the heat shrink tubing is calculated by subtracting the recovered tubing ID from the expanded tubing ID and dividing by the expanded tubing ID, then multiplying this quantity by 100 to give the overall percentage change in diameter (ΔD).

With regard to the heat shrink capabilities, in certain embodiments, the tubing disclosed herein is capable of shrinking (decreasing in diameter) when subjected to heat (e.g., due to being in an expanded state). Heat shrink materials are generally applied to an underlying material (e.g., a catheter construction, medical device component, etc.), and heated. When subjected to the heat cycle, the inner diameter and the outer diameter of the tubing will decrease (resulting in a smaller inner diameter (ID) and a smaller outer diameter (OD) than that exhibited by the expanded tubing, referred to as the "recovered" ID and OD). Preferably, the tubing shrinks substantially only in diameter and not substantially in length (i.e., it shrinks in one plane only). As noted above, the ratio between the expanded ID and the original input ID is referred to as the expansion ratio. The expansion ratio is the expanded ID divided by the original input ID. It has been discovered that expansion ratios much greater than 4:1 can be obtained by use of hotter die temperatures than typically used. For example, typical expansion ratios for the types of tubing described herein can be at least about 4:1 at least about 5:1, at least about 6:1, at least about 7:1, at least about 8:1, at least about 9:1, or at least about 10:1.

While high expansion ratios can be achieved using commercially available heat shrink methods, it should be noted that the heat shrink tubings of the present disclosure can surprisingly exhibit higher recovery ratios as compared to conventional heat shrink tubings known in the art (e.g., conventional heat shrink tubings known in the art typically have recovery ratios of 4:1 or less). As noted above, for example, the ratio between the expanded ID and the recovered ID is referred to as the recovery ratio. The recovery ratio is the expanded ID divided by the recovered ID. Without intending to be bound by theory, it was discovered that rapid cooling of the expanded tubing is effective to lock in the entropically unfavorable expanded state before the tubing begins to recover appreciably, thus producing a final product having a recovery ratio exceeding the commercially available maximum 4:1 recovery ratios. In some embodiments, this rapid cooling can be accomplished with a water cooled annular fixture attached to the end of the heated die. For example, in some embodiments, the PTFE heat shrink tubing of the present disclosure may exhibit a recovery ratio of at least about 4:1, at least about 5:1, at least about 6:1, at least about 7:1, at least about 8:1, at least about 9:1, or at least about 10:1.

Figure 3:
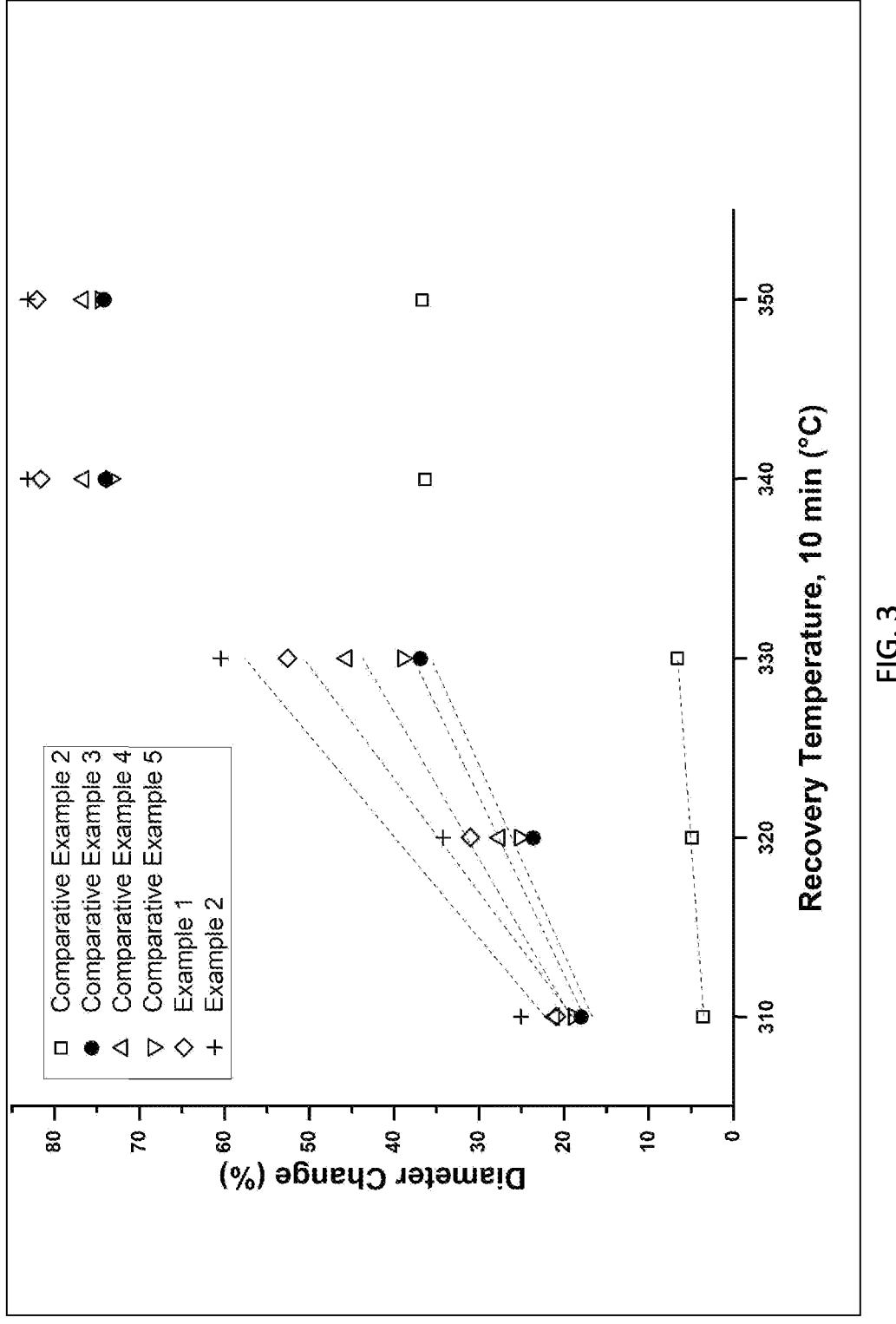
FIG. 3 is a graph showing the measured percent change in internal diameter, and linear regression thereof in the range of 310° C. to 330° C., for PTFE heat shrink tubes prepared according to an example embodiment of the present disclosure as compared to several commercially available PTFE heat shrink tubes when recovered at various temperatures for 10 minutes.

The recovery ratio of the heat shrink tubings of the present disclosure may also be characterized with respect to reducibility of their inner diameter, ID (e.g., the overall percent change of its diameter ΔD as calculated using the equation above). For example, a recovery ratio of 4.55:1 equates to an ID that is reducible by about 78%, a recovery ratio of 5:1 equates to an ID that is reducible by about 80%. As shown in FIG. 3, both Examples 1 and 2, which were prepared according to the methods of the present disclosure, exhibited a percent diameter change after recovery of about 80% or greater, whereas each of the comparative examples exhibited significantly lower percent diameter change after recovery.

In some embodiments, wherein the recovery ratios are within the ranges described herein above, the heat shrink tubings, when shrunk, exhibit low changes in longitude, e.g., such as less than about 20%. In certain embodiments, such heat shrink tubings may exhibit even lower changes in longitude, e.g., such as less than about 20%, less than about 15%, less than about 10%, less than about 9%, less than about 8%, less than about 7%, less than about 6%, less than about 5%, less than about 4%, less than about 3%, less than about 2%, less than about 1%, less than about 0.5%, or less than about 0.1%.

It should be noted that the higher recovery ratios of the heat shrink tubing described herein provides certain distinct advantages over commercially available heat shrink tubings. In particular, such higher recovery ratios can allow for encapsulation of complex mandrel shapes (e.g., including, but not limited to, tapered mandrels or mandrels with steep transitions). Further, providing such high recovery ratios at low temperatures, as noted herein, advantageously increases the types of polymeric materials that can be encapsulated without degradation. For example, in some embodiments, dual heat shrink structures with an outer layer (e.g., a PTFE heat shrink outer layer) having a higher recovery ratio can allow for complete encapsulation of the melting inner layer around complex parts and shapes. Examples of dual heat shrink structures and applications are provided, for example, in the disclosure of U.S. Pub. Pat. App. No. 2021/0370581 to Hunter et al., which is incorporated herein by reference in its entirety. Further, as noted herein, such high recovery ratios can result in those heat shrink tubes having the ability to recover over complex mandrel profiles, such as those with changes in diameter or taper angles and lengths, to provide thin wall catheter liners not currently available in the market.

In certain embodiments, the heat shrink tubing described herein may be described as "peelable," and can be readily peeled or torn apart in the longitudinal direction (e.g., to remove the heat shrink tubing from an underlying material). This peelability can advantageously allow for the tubing to be provided, used, and removed, in some embodiments, in the absence of any scoring, break lines, indentations, or perforations along the length of the tubing. It is noted that PTFE is inherently peelable in the machine direction (e.g., in the longitudinal direction) which can provide for easy removal of the heat shrink tubing after reflowing an inner polymeric material (e.g., a catheter jacket, medical device, or dual heat shrink structure). Examples of peelable heat shrink tubings are provided, for example, in U.S. Pat. No. 9,440,044 to Roof et al., which is incorporated by reference herein in its entirety.

Certain properties of the tubings disclosed herein can be evaluated by differential scanning calorimetry (DSC). DSC is an analytical technique that provides information on the thermal properties of materials, and is well known to those skilled in the art. A typical DSC experiment (commonly referred to as a single heat temperature ramp) can be performed to determine the peak temperature of the endothermic melting transition for semi-crystalline polymeric materials (e.g., PTFE). The peak temperature of the melting endotherm can vary depending on the particular makeup of the tubing (i.e., the type of fluorinated polymeric resin), and prior thermal history of the tubing (i.e., thermomechanical history imparted on the material during processing). The peak temperature of the melting endotherm observed on a DSC thermogram is generally abbreviated as $T_m$. The thermomechanical history that is imparted on heat shrink tubings of the present disclosure, using the methods described herein, alters the $T_m$ from what is observed for virgin PTFE resin on a DSC thermogram.

PTFE is known to have a high melting temperature and melt viscosity; the melting temperature of virgin PTFE resin is approximately 342° C. to 345° C. and the melt viscosity is in the range of about 1-10 GPa-s. This high melt viscosity inhibits flow that allows other thermoplastics to be processed through conventional melt extrusion techniques (e.g., utilizing a screw extruder). Due to PTFE's high melt viscosity, it is typically extruded as a paste through a ram extruder and sintered using equipment and procedures well known in the art. For example, the PTFE tube can be sintered at temperatures exceeding the melting point of virgin PTFE resin (i.e., 342° C. to 345° C.), such as in the range of about 360° C. to about 380° C. Typically, the PTFE tube is sintered for a period of time sufficient to allow fusion, coalescence, and void elimination to proceed so as to maximize certain properties of the PTFE tube.

Certain properties of the tubings disclosed herein can be evaluated by Dynamic Mechanical Analysis (DMA). DMA is an analytical technique used to study and characterize the viscoelastic behaviors of polymers as a function of time, temperature, and frequency. The storage modulus (E') is a measure of a material's elastic behavior (i.e., the ability of a material to store energy elastically). A typical DMA temperature ramp experiment involves the application of a sinusoidal deformation at a specified frequency, simultaneously monitoring the material's response (i.e., force), while the temperature is increased at a consistent (i.e., linear) rate.

The storage modulus of a test specimen obtained from a heat shrink tube in the circumferential direction undergoing a temperature ramp, as described above in a DMA, decreases with temperature until the expansion temperature is approached. At this point, a noticeable minimum is reached in the E'-T (storage modulus versus temperature) curve followed by an increase in E' as the heat shrink tube recovers in the direction of the dynamic mechanical test. The minimum in the E'-T curve will be referred to as $E'_{min}$ henceforth. The presence of an $E'_{min}$, that of which is not associated with a crystallization process, has been attributed to entropic elasticity; such as would be seen in the recovery of a previously expanded test specimen. See, e.g., L. Andena et al., *Polym. Eng. Sci,* 44, 2004, 1368-1378, which is incorporated herein by reference.

It should be noted that the $E'_{min}$ has been found to be an important parameter for describing the heat shrink tubings of the present invention. Typically, the processing parameters combined with material properties determine the crystalline/amorphous morphology of the expanded heat shrink tube that is locked into an entropically unfavorable state after the expansion process. This morphology determines the entropic elasticity available for the tube to recover from its expanded shape, as well as the extent to which it will recover when the tube is subjected to different recovery temperatures. Without intending to be bound by theory, it has been discovered that adjusting the processing parameters so that the $E'_{min}$ occurs at the lowest temperature possible in relation to the T. of the heat shrink tube is critical. For example, heat shrink tubes that recover to a larger extent at lower temperatures will perform better in many applications. It is thus desirable to produce PTFE heat shrink tubes that exhibit a large temperature difference between the peak of the melting endotherm obtained from a DSC temperature ramp and the minimum in the E'-T curve obtained from a DMA temperature ramp.

Heat shrink tubings provided herein can be used for a range of applications. In particular applications, they can be applied to an underlying material (e.g., devices, device components, joints, fittings, wires, etc.), and heated to form a covering thereon. Accordingly, the present disclosure encompasses materials or objects to which a tubing as disclosed herein has been applied. For example, in some embodiments, a covered device (e.g., medical device) comprising a tubing as disclosed herein is provided. Exemplary covered devices include, but are not limited to, medical devices (e.g., catheters) comprising any of the tubings disclosed herein applied thereto.

In various embodiments, the heat shrink tubings disclosed herein are prepared from one or more fluorinated polymeric resins. "Resin" as used herein refers to a material consisting essentially of a given type of polymer (e.g., a copolymer) or two or more polymers/copolymers. Resins are typically provided in solid form (e.g., as solid pellets), although they are not limited thereto (with other forms including, but not limited to, powders, pastes, granules, dispersions, solutions, gels, and the like). In some embodiments, the heat shrink tubings disclosed herein may comprise, consist of, or consist essentially of a fluorinated polymeric resin in one or more of the forms noted herein. In some cases, a "resin" as used herein may contain one or more additional components and/or one or more additives can be added thereto (e.g., such as a lubricant, colorant, and the like). In other embodiments, one or more additives (in granular, powder, or pellet form or in the form of a gel or liquid) can be included with the fluorinated polymeric resin and extruded therewith.

Any fluorinated polymeric resin can be used according to the present disclosure. Of particular relevance to the present disclosure are fluoropolymeric resins. Fluoropolymer resins are often used as heat shrink tubing for many applications requiring lubricity, chemical inertness, or high temperature stability. FEP, PFA and PTFE are among the more common fluoropolymer heat shrink tubes commercially available today, although the disclosure is not limited thereto. Exemplary fluorinated polymeric resins that are useful according to the present disclosure include, but are not limited to, resins wherein the polymer comprises, consists of, or consists essentially of, fluorinated ethylene propylene (FEP), polyvinylidene fluoride (PVDF), perfluoroalkoxy alkanes (PFA), perfluoro (alkyl vinyl ethers) (PAVE) (e.g., perfluoro (methyl vinyl) ether, PMVE or perfluoro (propyl vinyl) ether (PPVE)), a terpolymer of tetrafluoroethylene, hexafluoropropylene and vinylidene fluoride (THV), poly(ethylene-co-tetrafluoroethylene) (ETFE), ethylene chlorotrifluoroethylene (ECTFE), polychlorotrifluoroethylene (PCTFE), polytetrafluoroethylene (PTFE), a copolymer of tetrafluoroethylene and perfluoromethylvinyl ether (MFA); or copolymers, blends, or derivatives of any two or more thereof.

In certain embodiments, heat shrink tubings of the present disclosure are prepared using a PTFE resin, and thus in some embodiments, can consist of PTFE, can consist essentially of PTFE, or can comprise PTFE. Typically, PTFE resins can be provided in a variety of different forms, e.g., such as in the form of solids, powders, granules, dispersions, solutions, gels, and the like. In certain embodiments, PTFE heat shrink tubings may be prepared using PTFE powder, in particular. The type of PTFE powder that is incorporated in such embodiments can vary and may include conventional PTFE extrusion grade powder as well as PTFE granules, particles, and the like of various particle sizes. Extrusion grade PTFE resins are commercially available as POLYFLON™ PTFE F-205, manufactured by Daikin Industries Ltd., and DYNEON™ PTFE TF 2053Z, manufactured by 3M™ Company. However, it is to be understood that the heat shrink tubings provided herein are not limited to PTFE resins and may be prepared using one or more of the fluorinated polymer resins described herein in addition to PTFE, or in lieu of PTFE.

In general, the methods by which such heat shrink tubings are prepared can vary. Generally, the desired resin or resins (e.g., such as PTFE resin) are formed into a tubular form, e.g., via extrusion and then mechanically expanded. The means by which these steps are conducted can vary, as will be described herein.

A resin (e.g., such as a PTFE resin) may be formed into a tube, e.g., by subjecting the resin to extrusion. Extrusion generally comprises placing the desired resin or resins into an extruder (e.g., a ram extruder). Within the extruder, the resin or resins are heated, compressed, and forced through an annular die set, creating a tube. Tubes of various diameters and lengths can be produced. The tube dimensions can be set by the tooling size on the extrusion line and other parameters of the extrusion step can also be adjusted and optimized to produce the desired tubing. In some embodiments, tubing having a relatively uniform wall thickness is provided. Tube-forming tooling is fitted to the end of the extrusion cylinder and generally includes a rod, mandrel, master die, tube die and end cap heater.

Appropriate tooling to be used is determined by the required finished product size and reduction ratio. Reduction ratio controls extrusion pressure, fibrillation and mechanical properties of the PTFE resin or powder. Reduction ratio is a unitless number calculated from the ratio of the cross-sectional area of the extrusion cylinder minus the cross-sectional area of the mandrel rod and the cross-sectional area of the extrusion die minus the cross-sectional area of the mandrel tip.

During the extrusion process, as the resin particles enter the tube die zone, they are highly compressed. The particles deform and rub against each other under the application of high pressure, due to the reduction of the cross-sectional area in the direction of flow. The PTFE begins shearing of the secondary particles and crystallites begin to mechanically interlock, which results in the interconnection of adjacent particles. As the particles flow towards the exit of the die, they accelerate and elongate, during which the mechanically locked crystallites are unwound, creating fibrils. Typically, the more fibrils that are created, the more the paste gains elastic extensional properties that lead to higher extrusion pressures.

In some embodiments, upon exiting the extruder, the newly formed extruded tube can be transferred to a vaporization oven having a temperature in the range of about 232° C. to about 260° C. to remove any lubricant used during the pre-forming and extrusion process. In certain embodiments, the extruded tube can then be sintered for a period of time and at a desired temperature to obtain the desired final properties of the PTFE tube. In some embodiments, the extruded tube is sintered at temperatures exceeding the melting point of virgin PTFE resin (i.e., 342° C. to 345° C.), such as in the range of about 360° C. to about 380° C. Typically, the extruded tube is sintered for a period of time sufficient to allow fusion, coalescence, and void elimination to proceed so as to maximize certain properties of the PTFE tube.

In certain embodiments, the extruded tube can be air cooled following the sintering process to achieve a desired level of crystallinity in the final tubing. The level of crystallinity in the final tubing can vary as known in the art. For example, in some embodiments the degree of crystallinity in the final PTFE tube may be in the range of about 32% to about 48%.

The extruded tubular form is then typically radially expanded (e.g., by mechanical means) to provide an expanded tubing material, i.e., a heat shrink tubing (i.e., a tubing which decreases in diameter when heated). The expansion of the input tubing (i.e., the initial extruded tubular form) can be conducted in-line with extrusion, or off-line (i.e., conducted independently of and/or secondary to the extrusion process). All means for radial expansion of tubing are intended to be encompassed by the present invention. Generally, during the expansion process, the tubing is expanded radially by pressurizing the inside of the tubing, introducing stress into the tube wall. This pressurizing can be conducted by any means capable of providing a differential pressure between the inside and outside of the tubing. Such differential pressure can be created by imposing a pressure above atmospheric pressure in the center of the tube, imposing a pressure below atmospheric pressure on the outside of the tube, or a combination of the two. The stress induced into the wall of the tube causes it to expand radially, i.e., increase in diameter. The rate of expansion can be controlled so the tube will hold the expanded state and does not recover until subjected to a further heat cycle. The extent to which a tube is expanded depends on the application for which the tubing is intended. In some embodiments, the tubing is expanded to an internal diameter from about 1.05 times its original (unexpanded) diameter to about 10 times its original (unexpanded) diameter.

In certain embodiments, PTFE heat shrink tubes prepared according to the disclosure may be radially expanded using the processes described, for example, in U.S. Pat. No. 9,296,165 to Henson, which is incorporated by reference herein in its entirety. For example, the '165 patent describes a process for the production of fluoropolymer heat shrink tubing using a first fluid in the interior of a tube to expand it and a second fluid exterior to the tube to constrain the expansion within an expansion chamber. In other embodiments, for example, the tubing may be expanded by adjusting the flow rate of the air external to the tube, the chamber temperature, the air pressure within the tube, and the rate at which the tube moves through the expansion chamber. In certain embodiments, the heat shrink tubes of the present disclosure are expanded at elevated temperature through a die using any number of methods known to the art, and subsequently cooled at the die exit. Cooling can be accomplished using fluids such as water, oil or air. The processing parameters that can be adjusted include: die type, die diameter and length, die temperature, fluid pressure inside the tube, fluid pressure outside the tube, cooling method, cooling medium type and temperature, expansion rate, tube material, tube ID, tube OD, and tube wall thickness.

Heat shrink tubings provided herein can be used for a range of applications. In particular applications, a heat shrink tubing as provided herein can be applied to an underlying material (e.g., devices, device components, joints, fittings, wires, etc.), and heated/recovered to form a covering thereon. Accordingly, the present disclosure encompasses materials or objects to which a tubing as disclosed herein has been applied. For example, in some embodiments, a covered device (e.g., medical device) comprising a heat shrink tubing (e.g., in recovered form) as disclosed herein is provided. Exemplary covered devices include, but are not limited to, medical devices (e.g., catheters) comprising any of the tubings disclosed herein applied thereto.

In addition, it is noted that although the present application focuses on tubings, other products can be produced that exhibit the surprising and advantageous properties described herein. For example, a wide range of PTFE heat shrink products can be formed in accordance with the disclosure and can, in some embodiments, exhibit the heat shrink capability, higher expansion/recovery ratios, low longitudinal shrinkage, lower temperature recovery, and/or thin-walled construction as disclosed herein.

EXPERIMENTAL

Aspects of the present invention are more fully illustrated by the following examples, which are set forth to illustrate certain aspects of the present invention and are not to be construed as limiting thereof. Although the examples shown pertain to PTFE heat shrink tubing specifically, it is understood that fluoropolymer heat shrink tubes in general would benefit according to the present invention.

Comparative Example 1

Initially, a non-expanded, control PTFE tube sample was prepared with a nominal recovery ratio of 1:1 according to the method provided herein below. First, a PTFE fine powder was mixed with a 16%-25% aliphatic hydrocarbon based lubricant, rolled for 10-minutes, and then aged in a temperature controlled environment at 26° C. for a period of 24-hours. The lubricant was allowed to permeate into and coat the agglomerated PTFE particles during the 24-hour period. After aging, the PTFE powder/lubricant mixture was formed into a preform or billet through compression in a pre-form press where it was compacted into a cylindrical preform or billet. The pre-form press contained a rod in the center to permit flow of PTFE around a mandrel to form a tubular shape.

Next, the cylindrical/tubular pre-form or billet was then loaded into a ram extruder barrel or cylinder containing a rod to match the inside diameter of the cylindrical pre-form. During the extrusion process, the PTFE pre-form is highly compressed and extruded to form a compressed PTFE tube. Upon exiting the extruder, the newly formed PTFE tube was transferred to a vaporization oven having a temperature in the range of about 232° C. to about 260° C. The vaporization oven is used to remove the lubricant used during the pre-forming and extrusion process.

Next, the PTFE tube was sintered for a period of time at a desired temperature to obtain the final properties of the PTFE tube. The PTFE tube was sintered at temperatures exceeding the melting point of virgin PTFE resin (342° C. to 345° C.), such as in the range of 360° C. to 380° C. The PTFE tube was sintered for a period of time that allowed fusion, coalescence and void elimination to proceed and to maximize properties in the PTFE tube. The PTFE tube was subsequently air cooled to achieve a specified level of crystallinity in the final product. Typically, the PTFE will range in degree of crystallinity from about 32% to about 48%. The final product (e.g., PTFE tube) of Comparative Example 1 was manufactured in the above manner to give an internal diameter of 0.359" and an average wall thickness of about 0.033".

Comparative Example 2

A PTFE tube was prepared using the same method and conditions provided in Comparative Example 1. The resulting PTFE tube had an internal diameter of 0.487" and an average wall thickness of about 0.025".

After preparation, the PTFE tube was expanded by pressurizing the tube with air as it entered a heated die to increase the inside diameter up to the required expansion ratio. The inflated PTFE tube was subsequently cooled to lock in the expanded diameter such that when the tube was reheated to 350° C. the value of the RR was approximately 2. The inside diameter and average wall thickness of the PTFE tube after expansion were measured and are summarized in Table 1.

Comparative Example 3

A PTFE tube was prepared using the same method and conditions provided in Comparative Example 1. The resulting PTFE tube had an internal diameter of 0.159" and an average wall thickness of about 0.015".

After preparation, the PTFE tube was expanded by pressurizing the tube with air as it entered a heated die to increase the inside diameter up to the required expansion ratio. The inflated PTFE tube was subsequently cooled to lock in the expanded diameter such that when the tube was reheated to 350° C. the value of the RR was approximately 4. The inside diameter and average wall thickness of the PTFE tube after expansion were measured and are summarized in Table 1.

Comparative Example 4

A PTFE tube was prepared using the same method and conditions provided in Comparative Example 1. The inside diameter and average wall thickness of the PTFE tube were measured and are summarized in Table 1.

The PTFE tube was then expanded by heating the PTFE tube and inflating it with pressurized air as it enters a die. The die has openings along its ID that allow for pressurized air to circulate between the OD of the PTFE tube and the ID of the die to maintain a desired expanded diameter. The PTFE tube inflated in this manner was subsequently cooled as it exited the die to lock in the expanded diameter such that when the tube was reheated to 350° C. the value of RR was approximately 4. The inside diameter and average wall thickness of the PTFE tube after expansion were measured and are summarized in Table 1.

Comparative Example 5

A PTFE heat shrink tube commercially available in the market was purchased. The inside diameter and average wall thickness of the PTFE tube were measured and are summarized in Table 1. After preparation, the PTFE tube was then heated to 350° C. in an oven for 10 minutes and the RR was calculated to be around 4.

Example 1

A PTFE tube was prepared using the same methods and conditions provided in Comparative Example 1. The resulting PTFE tube had an internal diameter of 0.042" and an average wall thickness of about 0.013".

After preparation, the PTFE tube was then expanded using the process of Comparative Example 4. However, in this instance the processing parameters of inflation air pressure, inflation air temperature, die air pressure, die air temperature, die air flowrate, tube throughput, cooling air temperature, and flowrate were all adjusted to give a PTFE heat shrink tube according to the present disclosure. In particular, the PTFE tube was expanded using an expansion temperature of 443° C., an internal air pressure of 40 psi, and a die air flow rate of 2 cubic feet per minute (cfm). The inside diameter and average wall thickness of the PTFE tube after expansion were measured and are summarized in Table 1.

Example 2

A PTFE tube was prepared using the same methods and conditions provided in Comparative Example 1. The resulting PTFE tube had an internal diameter of 0.042" and an average wall thickness of about 0.013".

The PTFE tube was then expanded using the process of Comparative Example 4. However, in this instance the processing parameters of inflation air pressure, inflation air temperature, die air pressure, die air temperature, die air flowrate, tube throughput, cooling air temperature, and cooling air flowrate were all adjusted to give a PTFE heat shrink tube according to the present disclosure. In particular, the PTFE tube was expanded using an expansion temperature of 443° C., an internal air pressure of 45 psi, and a die air flow rate of 2 cubic feet per minute (cfm). The inside diameter and average wall thickness of the PTFE tube after expansion were measured and are summarized in Table 1.

Cumulative Results

Table 1 below provides the nominal tube dimensions of the final PTFE tubes prepared in Comparative Examples 1-5 and Examples 1-2. The dimensions measured include the internal diameter after expansion, the average wall thickness after expansion, and the nominal recovery ratio. Both the internal diameter and wall thickness were measured in units of inches. As shown in Table 1 below, the PTFE tubes prepared according to Examples 1 and 2 exhibited significantly lower internal diameters as compared to most comparative examples, significantly lower wall thicknesses as compared to Comparative Examples 1 and 2, and the highest recovery ratios.

TABLE 1

| Nominal Tube Dimensions | | | |
| --- | --- | --- | --- |
| Example | $ID_e$ [in] | Wall Thickness [in] | Nominal RR |
| Comp. 1 | 0.359 | 0.033 | — |
| Comp. 2 | 0.800 | 0.015 | 2 |
| Comp. 3 | 0.675 | 0.004 | 4 |
| Comp. 4 | 0.414 | 0.002 | 4 |
| Comp. 5 | 1.440 | 0.004 | 4 |
| Ex. 1 | 0.270 | 0.003 | 5 |
| Ex. 2 | 0.290 | 0.003 | 6 |

Figure 2:
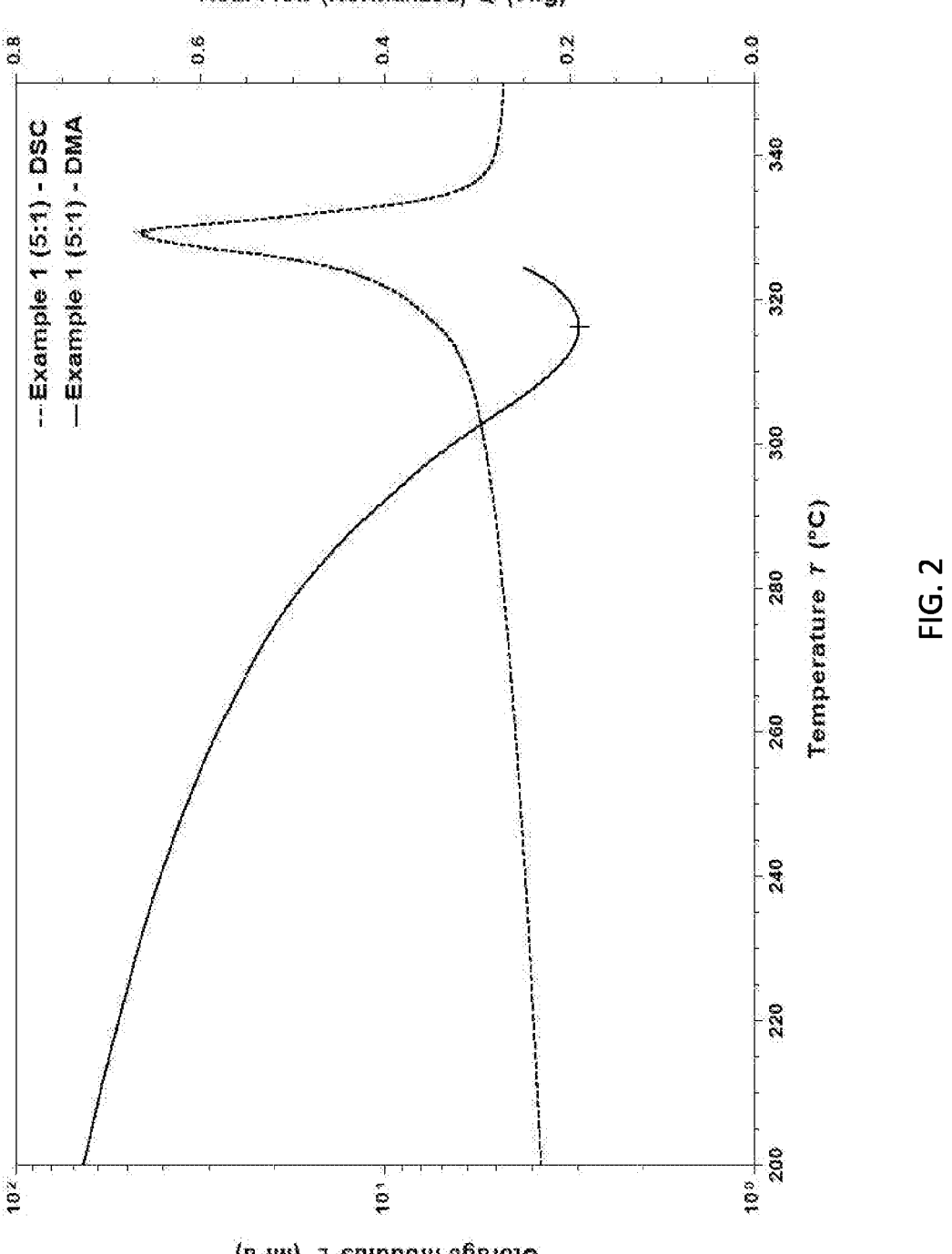
FIG. 2 is an overlay of DSC and DMA curves obtained from a PTFE heat shrink tube prepared according to an example embodiment of the present disclosure.

Table 2 below provides a summary of the DMA temperature ramp and DSC temperature ramp data of the final PTFE tubes prepared in Comparative Examples 1-5 and Examples 1-2. DMA and DSC data of an exemplary embodiment of the present invention is shown in FIG. 2. The particular parameters recorded in Table 2 include the temperature at which the minimum storage modulus occurred ($E'_{min}$), the peak temperature of the melting endotherm ($T$.), and the difference in the temperature at which the minimum storage modulus occurred and the peak temperature of the melting endotherm ($AT$ ($T_m$–$E'_{min}$)). To obtain the DSC thermograms, specimens of approximately 10 mg were cut from the PTFE tubes, crimped in a non-hermetically sealed aluminum pan, and heated using a single temperature ramp in a TA Instruments DSC2500 (New Castle, DE) from ambient temperature up to 400° C. at a heating rate of 10° C./min to determine the $T_m$. To obtain the DMA temperature ramp data, specimens were prepared by cutting a 5 mm length from the shrink tubes, and slitting the ring longitudinally so that a rectangular specimen oriented in the circumferential direction was obtained. Temperature scans of E' were collected from ambient temperature to approximately 340° C. at a heating rate of 3° C. per minute, a deformation amplitude of 15 µm at 1 Hz on a TA Instruments Q800 DMA (New Castle, DE) in tension mode. It should be noted that some of the collected temperature scans were automatically stopped by the instrument prior to reaching the 340° C. final temperature, as shown in FIG. 1. Without intending to be bound by theory, this was due to some of the specimens recovering to an extent before 340° C. where the tension grips physically touched, forcing the instrument to terminate the experiment.

TABLE 2

| | DMA and DSC Data [° C.] | | |
|---|---|---|---|
| Example | $E'_{min}$ | $T_m$ by DSC | $\Delta T$ ($T_m - E'_{min}$) |
| Comp. 1 | — | 327.8 | — |
| Comp. 2 | 327.3 | 327.8 | 0.5 |
| Comp. 3 | 323.9 | 327.4 | 3.5 |
| Comp. 4 | 321.6 | 328.4 | 6.8 |
| Comp. 5 | 322.4 | 329.6 | 7.2 |
| Ex. 1 | 316.2 | 329.4 | 13.2 |
| Ex. 2 | 313.4 | 329.1 | 15.7 |

FIG. 1 shows the separation in temperature of the E' minimum for Comparative Examples 1-5 and Examples 1-2. As shown in FIG. 1, the control sample (Comparative Example 1) does not exhibit a significantly defined relative minimum in the E'–T curve, as exhibited by Comparative Examples 2-5 and Examples 1-2. This demonstrates that the $E'_{min}$, as defined and disclosed herein, is driven by the entropically unfavorable state that is locked into the PTFE heat shrink tubing during expansion; and, is directly influenced by the amount of entropic elasticity available when recovery is initiated by heating the PTFE heat shrink tubing.

FIG. 2 shows the separation in temperature of the E' minimum and the peak of the melting endotherm for Example 1, which is representative of an example embodiment of the present disclosure. As shown in FIG. 2, the heat shrink tube of Example 1 exhibits a large temperature difference between the peak of the melting endotherm observed on a DSC thermogram and the minimum in the E'-T curve obtained during a DMA temperature ramp.

Table 3 below summarizes the recovery ratio (RR) and change in length ($\Delta L$) for the PTFE heat shrink tubing samples of Comparative Examples 2-5 and Examples 1-2, when recovered at various temperatures for 10 minutes as noted herein above. As noted in Table 3, Examples 1 and 2 exhibited significantly higher recovery ratios compared to the Comparative Examples without significant adverse impacts to the change in length of the final product upon recovery.

TABLE 3

| | Results for Unrestricted Recovery at Specified Recovery Temperature for 10 minutes | | | | | | | | | | | |
|---|---|---|---|---|---|---|---|---|---|---|---|---|
| Oven | Ex. 1 | | Ex. 2 | | Comp. 2 | | Comp. 3 | | Comp. 4 | | Comp. 5 | |
| Temperature [° C.] | RR | $\Delta L$ [%] | RR | $\Delta L$ [%] | RR | $\Delta L$ [%] | RR | $\Delta L$ [%] | RR | $\Delta L$ [%] | RR | $\Delta L$ [%] |
| 310 | 1.26 | −1.6 | 1.33 | −3.1 | 1.04 | −1.5 | 1.22 | −3.5 | 1.28 | −1.6 | 1.23 | −5.0 |
| 320 | 1.45 | −2.7 | 1.52 | −4.3 | 1.05 | −2.7 | 1.31 | −4.7 | 1.38 | −1.9 | 1.34 | −7.3 |
| 330 | 2.14 | −3.7 | 2.54 | −5.3 | 1.07 | −4.3 | 1.59 | −8.6 | 1.84 | −2.3 | 1.64 | −11.7 |
| 340 | 5.44 | 12.3 | 5.95 | 8.0 | 1.57 | 0.4 | 3.85 | 0.8 | 4.27 | 14.1 | 3.76 | −10.5 |
| 350 | 5.59 | 10.5 | 5.92 | 7.8 | 1.58 | 2.3 | 3.87 | 0.0 | 4.28 | 14.1 | 3.94 | −5.5 |

Table 4 below summarizes the diameter change for the PTFE heat shrink tubing samples of Comparative Examples 2-5 and Examples 1-2 when recovered at various temperatures for 10 minutes. As noted in Table 4, Examples 1 and 2 exhibited significantly higher percentages in diameter change as compared to the Comparative Examples across all temperature ranges.

TABLE 4

| | Results for Diameter Change [%] at Specified Recovery Temperatures for 10 minutes | | | | | |
|---|---|---|---|---|---|---|
| Oven Temperature [° C.] | Ex. 1 | Ex. 2 | Comp. 2 | Comp. 3 | Comp. 4 | Comp. 5 |
| 310 | 20.9 | 25.1 | 3.6 | 18.0 | 21.1 | 18.9 |
| 320 | 31.0 | 34.3 | 4.9 | 23.6 | 27.6 | 25.2 |
| 330 | 52.5 | 60.4 | 6.6 | 36.9 | 45.6 | 39.0 |
| 340 | 81.6 | 83.2 | 36.4 | 74.0 | 76.6 | 73.4 |
| 350 | 82.1 | 83.1 | 36.7 | 74.1 | 76.6 | 74.6 |

Table 5 below provides the linear regression data obtained from a linear regression of diameter change for each example in the range of 310° C. to 330° C. The diameter change was calculated at various recovery temperatures that the PTFE tubes were subjected to for 10 minutes. This data was imported into OriginLab's OriginPro 2019 v.9.6 data analysis and graphing software and diameter change was plotted against recovery temperature. To gage the propensity of the Example heat shrink tubes to recover to a larger extent at lower temperatures, a linear regression was conducted in the range of 310° C. to 330° C., (well below 350° C. where the maximum achievable RR for PTFE heat shrink occurs) for the diameter change vs. recovery temperature plots of each Example. The diameter change vs. recovery temperature plots for each Example including their respective regression lines is shown in FIG. 3.

TABLE 5

| Linear Regression Data for FIG. 3 | | | | | |
|---|---|---|---|---|---|
| Equation | | | $y = a + b*x$ | | | |
| Plot | Ex. 1 | Ex. 2 | Comp. 2 | Comp. 3 | Comp. 4 | Comp. 5 |
| Intercept | −471.18 | −525.60 | −43.91 | −277.00 | −360.34 | −294.16 |
| Slope | 1.581 | 1.767 | 0.153 | 0.947 | 1.224 | 1.006 |
| R-Square (COD) | 0.958 | 0.929 | 0.992 | 0.948 | 0.931 | 0.957 |

Table 6 below summarizes the average diameter change for each example in the range of 310° C. to 330° C. The average diameter change values represent the slope values obtained from the linear regression data in Table 5. From this analysis, it can be concluded that a higher slope value/ diameter change describes a heat shrink tube that recovers to a further extent at lower temperatures. Alternatively, a lower slope value/diameter change describes a heat shrink tube that recovers to a lesser extent at lower temperatures. As noted in Table 6, Examples 1 and 2 exhibited significantly higher diameter change over the measured temperature range as compared to the Comparative Examples, evidencing a heat shrink tube that recovers to a further extent at lower temperatures.

TABLE 6

| Results for Diameter Change (310-330° C.) | |
|---|---|
| Example | Diameter Change [%/° C.] |
| Comp. 2 | 0.15 |
| Comp. 3 | 0.95 |
| Comp. 4 | 1.22 |
| Comp. 5 | 1.01 |
| Ex. 1 | 1.58 |
| Ex. 2 | 1.77 |

Many modifications and other embodiments of the disclosure set forth herein will come to mind to one skilled in the art to which these disclosures pertain having the benefit of the teachings presented in the foregoing descriptions. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A heat shrink tubing having a recovery ratio (RR) greater than about 5:1, wherein the heat shrink tubing comprises one or more polymers selected from the group consisting of fluoropolymers and polyaryletherketones.

2. The heat shrink tubing of claim 1, wherein the heat shrink tubing comprises a fluoropolymer.

3. The heat shrink tubing of claim 2, consisting essentially of the fluoropolymer and, optionally, one or more additives.

4. The heat shrink tubing of claim 3, wherein the one or more additives are selected from the group consisting of lubricants, colorants, and combinations thereof.

5. The heat shrink tubing of claim 2, consisting essentially of the fluoropolymer.

6. The heat shrink tubing of claim 2, wherein the fluoropolymer is selected from the group consisting of fluorinated ethylene propylene (FEP), polyvinylidene fluoride (PVDF), perfluoroalkoxy alkanes (PFA), perfluoro (alkyl vinyl ethers) (PAVE) (e.g., perfluoro (methyl vinyl) ether, PMVE or perfluoro (propyl vinyl) ether (PPVE)), polytetrafluoroethylene (PTFE), a terpolymer of tetrafluoroethylene, hexafluoropropylene and vinylidene fluoride (THV), poly(ethylene-co-tetrafluoroethylene) (ETFE), ethylene chlorotrifluoroethylene (ECTFE), polychlorotrifluoroethylene (PCTFE), a copolymer of tetrafluoroethylene and perfluoromethylvinyl ether (MFA); and a copolymer, blend, or derivative of any two or more thereof.

7. A heat shrink tubing having a recovery ratio (RR) greater than about 5:1, wherein the heat shrink tubing comprises a polyaryletherketone.

8. The heat shrink tubing of claim 7, consisting essentially of the polyaryletherketone.

9. The heat shrink tubing of claim 7, wherein the polyaryletherketone is selected from the group consisting of polyetherketone (PEK), polyetheretherketone (PEEK), polyetherketoneketone (PEKK), polyetheretherketoneketone (PEEKK), and polyetherketoneetherketoneketone (PEKEKK).

10. The heat shrink tubing of claim 7, consisting essentially of the polyaryletherketone and, optionally, one or more additives.

11. The heat shrink tubing of claim 10, wherein the one or more additives are selected from the group consisting of lubricants, colorants, and combinations thereof.

12. A heat shrink tubing having a recovery ratio (RR) greater than about 5.5:1, wherein the heat shrink tubing comprises one or more polymers selected from the group consisting of fluoropolymers and polyaryletherketones.

13. The heat shrink tubing of claim 12, wherein the RR is greater than about 6:1.

14. The heat shrink tubing of claim 12, comprising a fluoropolymer selected from the group consisting of fluorinated ethylene propylene (FEP), polyvinylidene fluoride (PVDF), perfluoroalkoxy alkanes (PFA), perfluoro (alkyl vinyl ethers) (PAVE) (e.g., perfluoro (methyl vinyl) ether, PMVE or perfluoro (propyl vinyl) ether (PPVE)), polytetrafluoroethylene (PTFE), a terpolymer of tetrafluoroethylene, hexafluoropropylene and vinylidene fluoride (THV), poly(ethylene-co-tetrafluoroethylene) (ETFE), ethylene chlorotrifluoroethylene (ECTFE), polychlorotrifluoroethylene (PCTFE), a copolymer of tetrafluoroethylene and perfluoromethylvinyl ether (MFA); and a copolymer, blend, or derivative of any two or more thereof.

15. The heat shrink tubing of claim 12, comprising a polyaryletherketone selected from the group consisting of polyetherketone (PEK), polyetheretherketone (PEEK), polyetherketoneketone (PEKK), polyetheretherketoneketone (PEEKK), and polyetherketoneetherketoneketone (PEKEKK wherein the heat shrink tubing comprises a fluoropolymer.

16. The heat shrink tubing of claim 12, consisting essentially of the polymer and, optionally, one or more additives.

17. The heat shrink tubing of claim 16, wherein the one or more additives are selected from the group consisting of lubricants, colorants, and combinations thereof.

18. A heat shrink tubing having a recovery ratio (RR) greater than about 5:1, wherein the heat shrink tubing comprises one or more polymers selected from the group consisting of fluoropolymers and polyaryletherketones, wherein the heat shrink tubing has an average wall thickness of 0.003 inches or less after expansion.

19. The heat shrink tubing of claim 18, comprising a fluoropolymer selected from the group consisting of fluorinated ethylene propylene (FEP), polyvinylidene fluoride (PVDF), perfluoroalkoxy alkanes (PFA), perfluoro (alkyl vinyl ethers) (PAVE) (e.g., perfluoro (methyl vinyl) ether, PMVE or perfluoro (propyl vinyl) ether (PPVE)), polytetrafluoroethylene (PTFE), a terpolymer of tetrafluoroethylene, hexafluoropropylene and vinylidene fluoride (THV), poly(ethylene-co-tetrafluoroethylene) (ETFE), ethylene chlorotrifluoroethylene (ECTFE), polychlorotrifluoroethylene (PCTFE), a copolymer of tetrafluoroethylene and perfluoromethylvinyl ether (MFA); and a copolymer, blend, or derivative of any two or more thereof.

20. The heat shrink tubing of claim 18, comprising a polyaryletherketone selected from the group consisting of polyetherketone (PEK), polyetheretherketone (PEEK), polyetherketoneketone (PEKK), polyetheretherketoneketone (PEEKK), and polyetherketoneetherketoneketone (PEKEKK wherein the heat shrink tubing comprises a fluoropolymer.

\* \* \* \* \*